Sept. 23, 1952    B. F. TOFFLEMIRE    2,611,182
ANATOMICAL CONTACT-FORMING DENTAL
MATRIX BAND FOR ANTERIOR TEETH
Filed Dec. 27, 1949
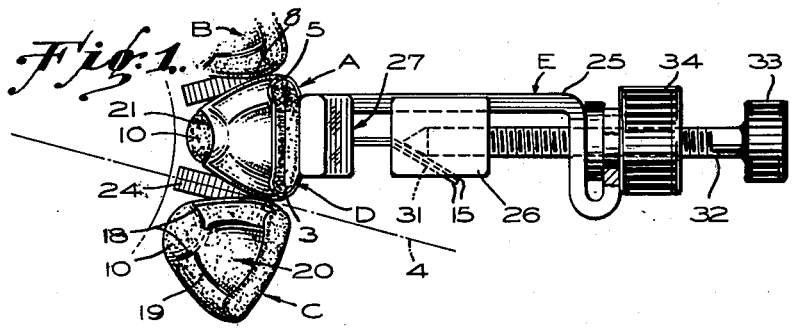
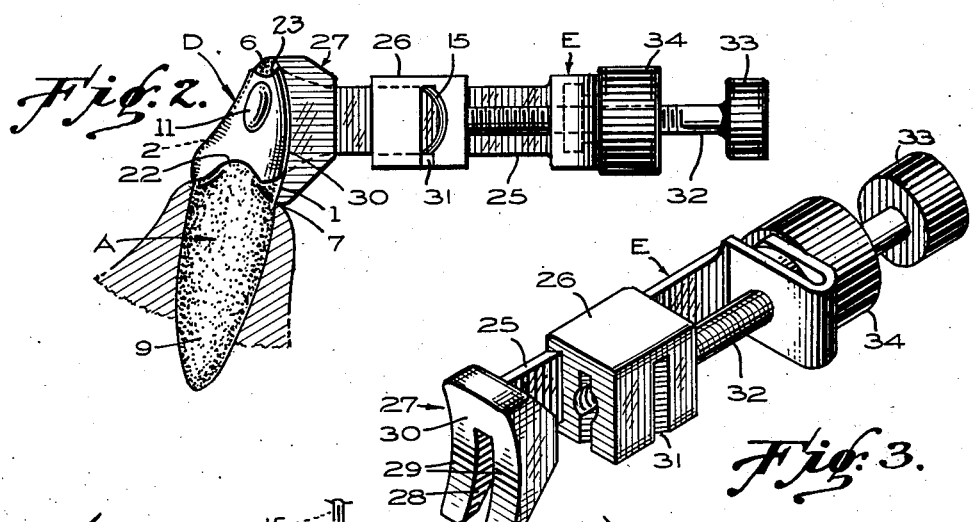
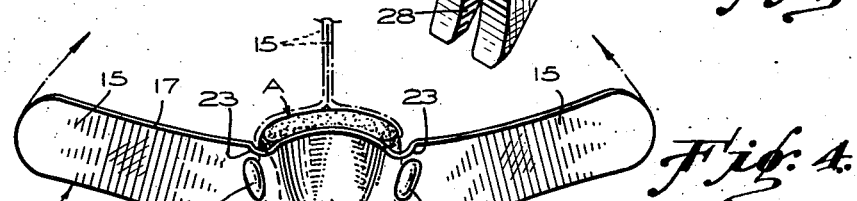
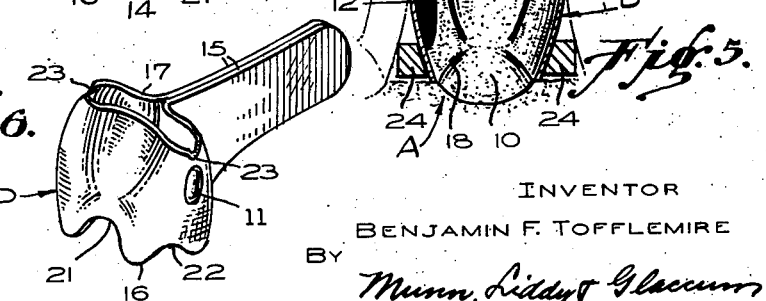
INVENTOR
BENJAMIN F. TOFFLEMIRE
BY
Munn, Liddy & Glaccum
ATTORNEYS Patented Sept. 23, 1952

2,611,182

UNITED STATES PATENT OFFICE 2,611,182

ANATOMICAL CONTACT-FORMING DENTAL MATRIX BAND FOR ANTERIOR TEETH

Benjamin F. Tofflemire, Lafayette, Calif.

Application December 27, 1949, Serial No. 135,047

5 Claims. (Cl. 32—63)

The present invention relates to anatomical contact-forming dental matrix bands for anterior teeth. It embodies improvements over the "arcuate" dental matrix bands disclosed in my copending application, Serial No. 82,547, filed in the United States Patent Office on March 21, 1949.

Moreover, this invention has reference to improvements over the anatomical contact-forming dental matrix bands shown in another copending case, Serial No. 106,713, filed July 25, 1949, in the United States Patent Office. In addition to the incorporation of the preformed interproximal eminences for the moulding and production of anatomically formed contact points, as disclosed in application Serial No. 106,713, the present invention makes use of additional new refinements in principle, design, function, operation and use— the manifold advantages of which will be pointed out as the specification continues.

This invention was developed in order to meet the specific need for a matrix retaining band and clamp capable of adaptation to the complex and involved tooth form found in anterior teeth. There has been very little research in this rather neglected field of operative dentistry.

In the first place, there has been no inducement, or incentive, for inventors and designers attempting the surmounting of the extremely difficult adaptation problems encountered in these particular teeth, since there has not been until recently any available material suitable for the plastic restoration of carious areas in anterior teeth. Foil gold and cast gold do not lend themselves to plastic insertion in carious areas occurring in the incisor teeth, and their conspicuous presence has been a serious objection to their use.

Amalgams, of course, may be inserted into carious teeth while in the plasticized state, and very readily lend themselves to moulding and packing into suitably designed dental matrix bands, but the objection of unsightly appearance has prevented their wide-spread employment in the anterior teeth.

The only other plastic material heretofore available has been silicate cement, the solubility, marginal friability, weakness and impermanence have all rightfully curtailed its use to those cases where esthetic considerations alone have outweighed the better judgment of the members of the profession.

However, with the advent of the new acrylic, low-heat, rapid curing resin materials recently developed, the profession has abruptly realized finally that it has come into possession of a suitable material to use on these problem cases, only to find that no suitable retainer or band has been designed and devised for their specific needs.

In practice, the stainless steel bands have proved to be admirably suited for use with these new acrylics, as they are not chemically affected by the liquid used in the processing, or polymerization. Moreover, when the bands are used in conjunction with my retainer, a constant spring tension is maintained upon the plastic mass during the short-oral-curing period.

This maintained spring pressure is produced by the inherent spring, elasticity, or resiliency of the stainless steel band and retainer while under positive mechanical tension, as exerted by the jack-screw action of my special retaining clamp. This constant spring tension during the curing process of acrylic restorations has been found a most desirable factor in the production of dense, well-fitting and beautiful restorations and the reduction and elimination of shrinkage during the polymerization process is practically assured.

Drawings

For a better understanding of this invention, reference should be had to the accompanying drawing, forming part of this application, in which:

Figure 1 is an incisal view of adjacent anterior teeth, disclosing the lower left central incisor encircled by my improved dental matrix band, the latter being secured in place by my retainer;

Figure 2 is a labio-lingual view of Figure 1, as seen from the mesial plane;

Figure 3 is an isometric view of the retainer by itself;

Figure 4 is a view looking toward the lingual (tongue) side of an anterior tooth and illustrating my dental matrix band being folded around the tooth;

Figure 5 is a mesial-distal view of the banded tooth, looking toward the lingual surface of the tooth, the band being shown in section and anchored in place by wedges; and Figure 6 is a perspective view of the preformed dental matrix band shaped to fit around the tooth.

While I have shown only the preferred form of my invention, it should be understood that various changes, or modifications, may be made without departing from the spirit thereof.

Detailed description

Referring to the drawing in detail, Figures 1 and 5 illustrate a lower left central incisor A, which is disposed between the lateral incisor B of the same quadrant and the central incisor C of the lower right quadrant. It will be understood, of course, that these are anterior teeth.

In order that the terms hereinafter used may be clearly understood, the parts of the incisor A are indicated by reference numerals as follows: 1, labial surface (toward the lips); 2, lingual surface (tongue side); 3, mesial surface (toward median plane 4 of the body); 5, distal surface (remote or away from the median plane); 6, incisal edge; 7, gingival (gum) border; 8, normal interproximal points of contact with adjacent teeth; 9, root; and 10, cingulum.

The present invention utilizes the principle of complete coronal surface-area adaptation of the anterior teeth by the specially designed and preformed stainless steel matrix band indicated generally at D. Concavo-convex eminences 11 are fashioned on this band, which define indentations or concavities 11a on the tooth-embracing face of the band disposed to register with the normal points of contact of the tooth being restored (see Figure 5). These indentations are positioned on both the mesial and distal aspects of the banded tooth, and receive extended portions of interproximal fillings.

In Figure 5, I have shown a filling 12 located on the distal aspect of the tooth A being packed. The extended portion of this filling will reform an eminence projecting toward the lateral incisor B at the normal points of contact between these teeth. A similar filling might be done on the mesial at the same time.

The matrix band D includes an arcuate central portion 14 having arms 15 projecting therefrom. This band defines gingival-facing and incisal-facing edges 16 and 17, respectively. It will be noted that the arms diverge relative to one another and slope outwardly from the central portion on the incisal-facing edge thereof when the band is flat (see Figure 4).

The crowns of the incisor teeth are extremely complex in their surface form, or morphology, presenting a curved cutting edge, at the incisal angle, made up of a convexly-rounded labial surface, the curvature of which varies throughout its extent from the gingival line to the incisal angle; and on the lingual aspect, by a concavely-rounded lingual surface, the curvature of which similarly varies throughout its extent. It is still further complicated by the presence of a peculiarly rounded eminence on the gingival border defining the cingulum 10.

In turn, the cingulum is bounded by a groove 18 on either side, which form a V-shaped gable-roof effect over the cingulum, with these two grooves being directed toward the gingival tissues and terminating at the gingival curvature. Incisally from the apex of this V-shaped gable over the cingulum, two additional grooves 19 form an additional V-shaped larger area—the lingual fossa area 20—on the lingual inclined plane of the incisor teeth. The two grooves 19 extend mesio-incisally and disto-incisally, respectively, terminating at a point about the beginning of the incisal third of the coronal area of these teeth.

These peculiar and characteristic anatomical marks are stamped in my special bands D, together with the preformed contact point eminences 11, and form an important and essential part of this invention. All incisor teeth have these peculiar characteristics, and I consider their reproduction in a matrix band indispensibly necessary, since this band is to be used as a form in moulding the areas of missing tooth portions, which have been lost because of caries, or accident.

As illustrated in Figure 4, the gingival-facing edge of the matrix band is provided with a central cingulum-receiving notch 21 and laterally-disposed gingival-facing notches 22. The band is placed so that the central notch 21 fits over the cingulum. The arms of the band extend through the mesial and the distal interproximal embrasures formed by the contact with the adjoining teeth on either side.

In this position, it will be noticed that each rounded notch 22 occurring on the interproximal areas will follow the gingival curvature of the teeth in these areas. Also, it will be noted that the preformed indentations 11a on the tooth-embracing face of the band produce eminences on the exterior surface of the band that are contoured outward in such a manner as to press snugly against the adjoining teeth on either side, that is, mesial and distal.

It will be noted further that the incisal-facing edge of the matrix band has two smaller incisal notches 23. These notches encircle the mesial and distal incisal angles, respectively, in such a manner that perfect adaptation to the tooth is secured without wrinkles, pleats, puckering, or undesirable irregularities.

The accurate adaptation secured by this specially designed band is especially suited for use with the new low-heat, fast curing, acrylic filling material for the following reasons:

(a) A perfect form or mould is made of the missing tooth surfaces by the pre-formed stainless steel matrix band;

(b) A snug fitting anatomically-rounded contact point is obtained on both the mesial and distal surfaces of the teeth worked upon;

(c) Constant spring tension is exerted by the specially formed band and my retainer, the latter being designated generally at E and hereinafter described in detail;

(d) Positive gingival adaptation is secured, permitting insertion of not only one but two interproximal restorations at the same time by insertion of securely fitting wedges 24 from the lingual aspect after the band is positioned on the tooth, with the lingual "saddle" notch 21 fitting over the cingulum 10;

(e) Positive exclusion of oral secretions, such as blood, mucous, or saliva, as well as the exclusion of air, or other possible contamination during the period of curing within the prepared cavity; and (f) Dimensionally stable, non-fluctuating mould of stainless steel, which remains chemically inert and unaffected by the acrylic materials during the process of polymerization or curing.

Referring now to Figures 1 to 3, inclusive, the retainer E is a modification of the retainer shown in my copending application, Serial No. 721,995, filed in the United States Patent Office on January 14, 1947 (now Patent No. 2,502,903, dated April 4, 1950). This retainer has been modified in such a manner as to adapt my new bands admirably to the anterior teeth.

Briefly, the retainer includes a bar-like frame 25 on which a matrix-clamping block 26 is slidably mounted. The frame has a shoe or head 27 at its forward end, which is slotted at 28 to define a pair of spaced-apart fingers 29. This head has a concaved face 30, adapted to bear firmly against the labial surface 1 of the banded tooth (see Figure 2). The retainer is moved relative to the band so that the parallel arms 15 will enter edgewise into the slot 28. At the same time, the ends of these arms are inserted edgewise into a diagonally-extending slot 31 formed in the block 26. A spindle 32 is threaded into the block and has a tapered forward end that clamps the band arms 15 to the block (see Figure 1). The spindle is rotated by an operating knob 33 that projects beyond the oral cavity of the patient.

A rotatable internally-threaded sleeve 34 is held against endwise movement relative to the frame 25. When the sleeve is turned, the spindle 32 and clamping block 26 are advanced or retracted relative to the shoe or head 27. Upon retracting the block away from the head, the matrix band D will be drawn up tightly against the axial contour of the banded tooth. The sleeve also extends beyond the oral cavity to give free access thereto.

Summary

The preformed matrix band D is placed on the selected anterior tooth in such a manner that the central notch 21 on the gingival-facing edge of the band fits over the cingulum 10, the arms 15 of the band passing outward labially past the mesial and distal contact points 8. Then the gingival wedges 24 are placed firmly along the outer surfaces of the band at the free margin of the gingival tissues, as shown in Figures 1 and 5, to hold the stainless steel band securely adapted to the margins of the prepared cavities. This will positively prevent the extrusion of any of the acrylic filling material 12 during compression and curing.

The free arms 15 of the band may be opened up laterally, that is, spread mesially and distally, after the wedges are placed. This will give access to the cavity on the mesial and the cavity of the distal, readily permitting the packing of the freshly prepared acrylic resin into the prepared cavities.

Thereafter, the free arms of the band are brought together, as in Figure 6, and inserted into the slots 28 and 31. The curved face 30 of the shoe or head 27 is concavely-contoured to fit comfortably against the labial surface of the anterior tooth. The arms of the band are locked in the diagonal slot 31 of the clamping block 26 by turning the knob 33 to advance the spindle 32. Next, the sleeve 34 is rotated to draw the band tightly around the encircled tooth.

The curved shoe of the retainer not only guides the band in following the contour of the tooth, but securely holds the band in position with a spring tension throughout the curing process. The resilient spring tension exerted by the specially formed stainless steel band and retainer has been found most useful in the prosthetic moulding of acrylics during processing, and have provided such a "spring-tension" by means of the so-called spring clamps and spring flasks in general laboratory procedures. The same time-proved spring tension methods now may be used on the filling operations where acrylic materials are used in the filling of the cavities in living teeth.

I claim:

1. In a dental matrix band for anterior teeth: a looped strip of material adapted to encircle the axial contour of an anterior tooth; the strip having gingival-facing and incisal-facing edges; the gingival-facing edge having a saddle-like notch therein adapted for snugly straddling the cingulum of the banded tooth, with the cingulum projecting into this notch, when lateral portions of the gingival-facing edge beyond the notch are disposed in registry with the gingival curvature of the tooth in the interproximal areas; the wall defined by this notch being shaped and dimensioned to abut and coact with the cingulum to preclude rotation of the strip around the banded tooth when the looped strip is placed on the tooth; the strip further having laterally-disposed notches in its gingival-facing edge adapted for following the gingival curvature of the tooth in the interproximal areas.

2. In a dental matrix band for anterior teeth: a strip of material having a preformed loop adapted to encircle the axial contour of an anterior tooth; this loop being shaped to have complete coronal surface-area adaptation with the tooth; the strip defining gingival-facing and incisal-facing edges; the latter edge having incisal notches therein arranged for encircling the mesial and distal incisal angles of the banded tooth to promote proper adaptation of the loop to the tooth and preclude distortion of the strip loop in the regions of these angles.

3. In a dental matrix band for anterior teeth: a looped strip of material adapted to encircle the axial contour of an anterior tooth; the strip including a preformed offset portion adapted for fitting against the lingual inclined plane of the banded tooth; this portion being pre-shaped to correspond with the bear against that lingual inclined plane in the conforming relation therewith; the strip having gingival-facing and incisal-facing edges; the gingival-facing edge having a centrally-disposed saddle-like notch therein adapted for snugly straddling the cingulum of the banded tooth, with the cingulum projecting into this notch; the wall defined by this notch being shaped and dimensioned to coact with the cingulum to correctly position the offset portion of the strip on the lingual inclined plane of the banded tooth when the looped strip is placed on the tooth.

4. In a dental matrix band: a strip of material defining a loop made to entirely encircle the axial contour of an anterior tooth; the strip providing end arms extending labially from the loop and adapted for engagement by a matrix retainer; the strip having gingival-facing and incisal-facing edges; the loop of the strip including a preformed offset portion sloping inwardly and incisally with respect to the loop; this portion being shaped to bear against the lingual inclined plane of the banded tooth in conforming relation therewith; the gingival-facing edge having a centrally-disposed saddle-like notch therein adapted for snugly straddling the cingulum of the banded tooth, with the cingulum projecting into this notch; the wall defined by this notch being shaped and dimensioned to coact with the cingulum to correctly position the offset portion of the strip on the lingual inclined plane of the banded tooth when the looped strip is placed on the tooth.

5. The combination as defined in claim 4, in which the offset portion of the band has a pair of preformed stamped marks therein corresponding with and adapted for fitting into two natural grooves of the tooth that border the cingulum, with these marks diverging downwardly with respect to each other and terminating at the gingival-facing edge of the strip; said band portion further having another pair of preformed stamped marks therein corresponding with and adapted for fitting into two other natural grooves in the tooth; the latter marks diverging upwardly relative to one another in mesio-incisally and disto-incisally directions and terminating at about the beginning of the incisal third of the coronal area of the banded tooth.

BENJAMIN F. TOFFLEMIRE.

REFERENCES CITED

The following references are of record in the file of this patent:

UNITED STATES PATENTS

| Number | Name | Date |
|---|---|---|
| 638,973 | Mehlig | Dec. 12, 1899 |
| 1,126,949 | Brouillet | Feb. 2, 1915 |
| 2,152,877 | Dagavarian | Apr. 4, 1939 |
| 2,310,448 | Leib | Feb. 9, 1943 |

FOREIGN PATENTS

| Number | Country | Date |
|---|---|---|
| 229,976 | Switzerland | Nov. 30, 1942 |
| 453,283 | Great Britain | Sept. 9, 1936 |